Patented Oct. 21, 1947

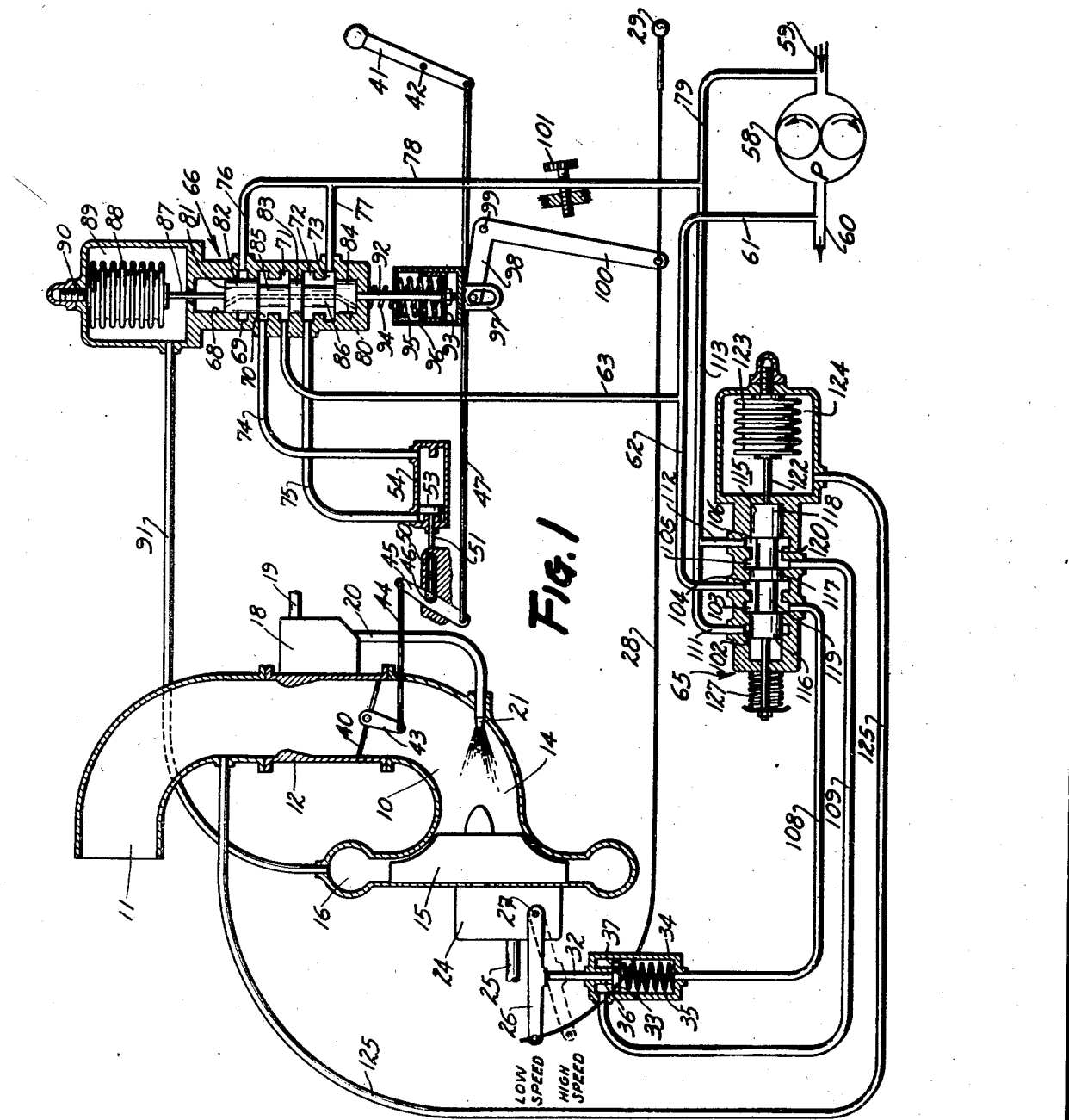

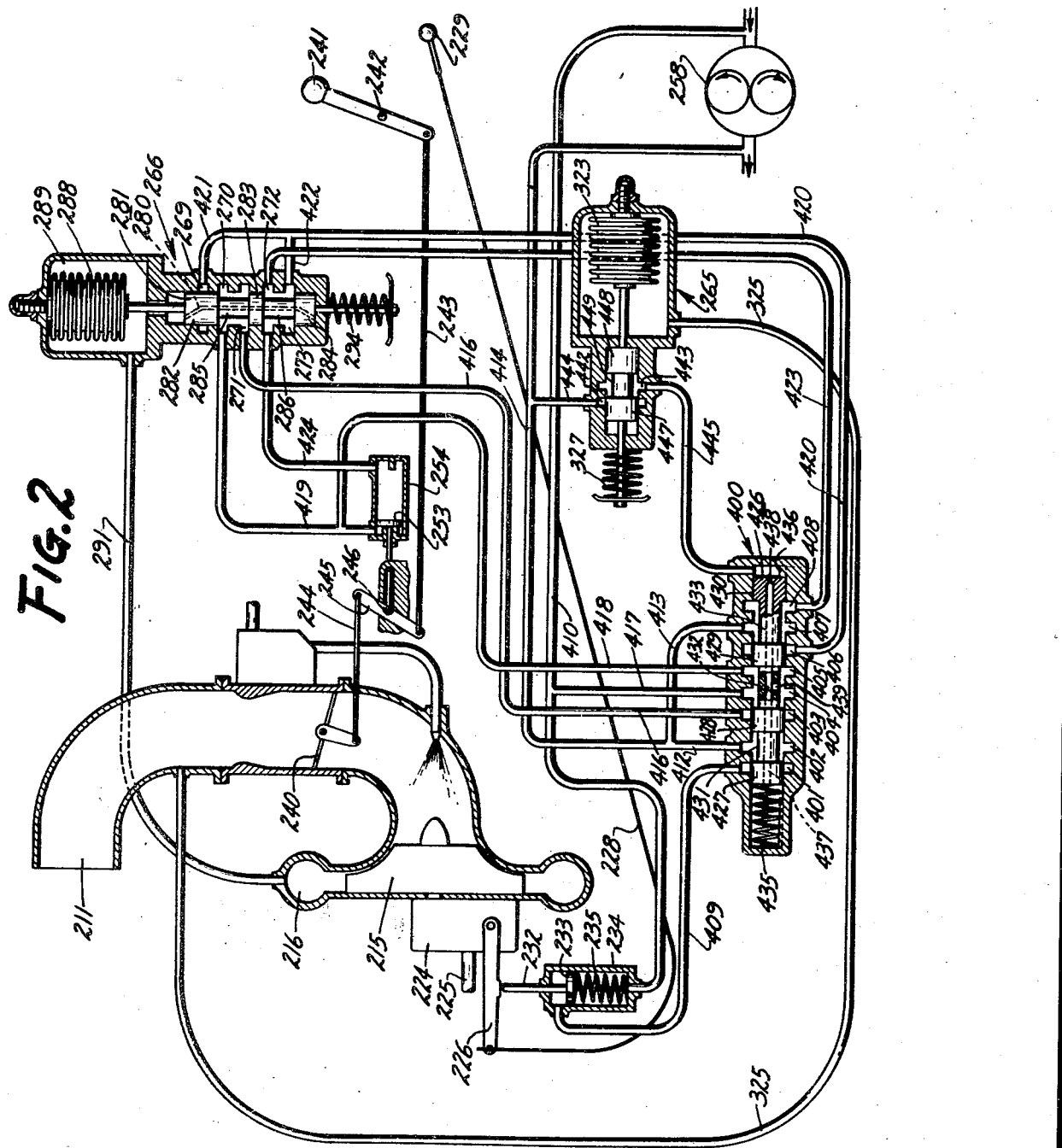

2,429,423

UNITED STATES PATENT OFFICE 2,429,423

CONTROL FOR INTERNAL-COMBUSTION ENGINES

Frank C. Mock, South Bend, Ind., assignor to Bendix Aviation Corporation, South Bend, Ind., a corporation of Delaware Application October 17, 1941, Serial No. 415,339

26 Claims. (Cl. 123—119)

This invention relates to controls for internal combustion engines and more particularly to boost controls for limiting the charging pressure in aircraft engines.

Present-day supercharged engines are capable of developing their maximum safe, or rated, horsepower at altitudes up to some predetermined, or rated, altitude, and below this altitude the engine must be throttled to prevent overcharging and possible resulting damage to the engine. A device generally referred to as a boost control is commonly provided to automatically regulate or limit the throttle opening to prevent overcharging. To increase the rated altitude it has been customary to provide a supercharging system of larger capacity in which either the supercharger impeller was of increased size or the gear ratio between the engine and impeller was changed to drive the impeller at an increased speed. A large capacity supercharger, however, necessitates severe throttling of the engine during operation at low altitudes, to avoid overcharging the engine, as well as during low power operation, or cruising, at high altitudes. During such periods of throttled operation the high capacity of the supercharger is not required and considerable power is needlessly consumed and the engine efficiency lowered by first highly compressing the air charge and then severely throttling it to reduce its pressure. The resulting loss in operating economy, although undesirable with any type of aircraft, is particularly detrimental with military aircraft of the observation or patrol types in which the pilot flies at the minimum speed or power output necessary to maintain flight so as to conserve fuel and remain aloft the longest possible time between refuelings.

To avoid unnecessary wasting of power at times when a high degree of supercharging is not required, it is proposed to provide a multiple step supercharging system of either the multi-speed type, in which the ratio of the impeller to engine speed may be varied, or of the multi-stage type, in which two or more superchargers are arranged in series and one or more of them may be rendered inoperative, or of a combination multi-speed, multi-stage type. With such systems the first step or degree of supercharging is generally sufficient to maintain the rated horsepower up to a predetermined altitude or throughout what might for convenience be referred to as the first altitude zone. The second step of supercharging is required to maintain rated power from this altitude up to a predetermined higher altitude, or in the second altitude zone. In a three or four step supercharging system there will be similar third and fourth altitude zones.

In changing altitude from one zone, while operating in the corresponding supercharger step, to a lower zone it is desirable to automatically change the supercharger step to that corresponding to the lower zone to avoid losses in efficiency resulting from excessive supercharger power consumption. The supercharger step, however, should preferably not be automatically increased upon change to a higher altitude zone as the additional available power resulting from the increased supercharging is in many cases not required.

It is generally desirable for the boost control to prevent overcharging of the engine regardless of the altitude zone; however, in some forms of military service the altitude zone adjacent the ground is considered a danger zone in which the boost control should be eliminated so that the pilot, if necessary, may temporarily overcharge the engine in order to obtain increased speed or rate of climb to out-maneuver a pursuing enemy craft. With such an arrangement the first step of supercharging is preferably sufficient to partially overcharge the cylinders but insufficient to create overcharging to a degree which would cause immediate failure of the engine. The second or any higher step of supercharging, however, would be sufficient to cause rapid failure of the engine and automatic means should therefore be provided to limit the supercharger to the first step while in this zone.

For some installations it is desirable to use a boost control of the fixed datum type, wherein the charging pressure is prevented from exceeding some predetermined maximum value regardless of the supercharger step being used. The maximum power developed by the engine, as limited by the boost control, will then tend to remain constant regardless of the supercharger step; however, upon an increase in the supercharger step a greater portion of the developed power is used by the supercharger and the power available at the propeller is correspondingly decreased. To avoid this decrease with installations in which it is undesirable I utilize a variable datum type boost control in which the permissible charging pressure is increased with increase in supercharger step whereby the maximum developed engine power will be increased to at least partially compensate for the added power consumed by the supercharger.

It is an object of the present invention to provide an improved boost control for internal combustion engines.

A further object of the invention is to provide an improved combination throttle and supercharger boost control for an aircraft engine having a multiple step supercharging system.

A further object of the invention is to automatically decrease the degree or capacity of the supercharging system upon a decrease in altitude.

A still further object of the invention is to provide a variable datum boost control for an aircraft engine having a multiple step supercharging system, wherein the datum is varied upon variation in the step or degree of supercharging.

A further object of the invention is to provide a control for an aircraft engine having a multiple step supercharging system whereby the supercharging step may be varied at will at high altitudes but is limited at low altitudes.

A still further object of the invention is to provide an improved control for supercharged aircraft engines.

Other objects and advantages of the invention will be readily apparent to one skilled in the art from the following description taken in connection with the appended drawings in which:

Figure 1 is a diagrammatic sectional view of one embodiment of the invention; and Figure 2 is a similar view of another embodiment of the invention.

For convenience a multiple step supercharging system of the two-speed type has been illustrated in the drawings; however, it will be apparent that the invention is equally applicable to multi-speed superchargers having more than two speeds, or to multi-stage superchargers, or to multi-speed multi-stage supercharging systems.

With particular reference to Figure 1 there is shown an induction passage 10 for an internal combustion engine having an air inlet 11, a Venturi section 12, and a section 14 leading to the entrance of a supercharger 15 having an annular discharge ring 16 from which the individual cylinders are supplied. Fuel may be supplied to the engine by any desired fuel feeding system, such as, for example, a carburetor 18 of the pressure feed type disclosed in my copending application Serial No. 362,572, filed October 24, 1940, which receives fuel through pipe 19 and delivers it through pipe 20 and nozzle 21 to the air flowing through the passage 10. The supercharger 15 is of the two-speed type and is driven through a two-speed gear box 24 by an engine driven shaft 25. A lever 26, secured at 27 to a shaft or other shifting mechanism of the gear box 24, is adapted to change the gear ratio to provide a low supercharger speed when the lever is up, as shown in solid lines, and a higher impeller speed when the lever is pulled down to the position indicated by dotted lines. In a two-stage supercharger the lever 26 would control the operation of the second stage. A control cable 28 interconnects the lever 26 and a knob 29 mounted in the pilot's cockpit whereby the pilot may move the lever 26 up or down to decrease or increase the impeller speed. The cable 28, although diagrammatically shown as a simple cable, is preferably of the sheathed cable type capable of exerting a force in either direction on the lever 26. A rod 32, serving both as a movable stop for preventing or restraining downward movement of lever 26 and as an actuating member for shifting the lever from its down or high speed position to its up or low speed position, is secured to a piston 33 slidably mounted in cylinder 34 and urged upwardly by a spring 35 against a stop 36. The piston 33, hydraulically operated as will be described hereinafter, may be provided with a small port 37.

The air flow to the engine is variably controlled by a throttle 40, pivotally mounted in the induction passage 10. The throttle 40 is connected to a pilot's throttle control lever 41, pivotally mounted in the pilot's compartment at 42, by means of a lever 43, link 44, lever 45 having a pivot 46, and link 47. The pivot 46 is slidable in a fixed slot 50 and is variably positioned therein by a rod 51 connected to a piston 53 slidably mounted in a cylinder 54 and adapted to be hydraulically operated as will be hereinafter described. Permissible travel of the pivot 46 may be limited either by the ends of the slot 50 or by piston stops in the cylinder 54.

A pump 58, which may either be the main oil pump for the engine or a pump for an auxiliary hydraulic system, receives fluid through a pipe 59 from a reservoir or sump and discharges it under high pressure through pipe 60 to the lubricating or auxiliary hydraulic system. Any source of a motivating fluid could be used in place of pump 58. Ducts 61, 62 and 63 transmit high pressure fluid to two servo valves indicated generally at 65 and 66 which respectively control the flow of motivating fluid to the cylinders 34 and 54.

The servo valve 66 comprises a cylindrical bore 68 having grooves 69, 70, 71, 72 and 73 in the wall thereof. Grooves 70 and 72 respectively communicate by means of pipes 74 and 75 with the cylinder 54 to the right and left of the piston 53; groove 71 is in communication with the high pressure fluid supply pipe 63; and grooves 69 and 73 communicate by means of fluid return pipes 76, 77, 78 and 79 with the inlet pipe 59 of the pump 58. A valve element 81, slidable within the bore 68 is provided with lands 82, 83 and 84 separated by relieved portions 85 and 86. A bore 80 may be provided in the valve 81 to balance the pressures on opposite ends of the valve. The valve 81 is connected at its one end by a rod 87 to the free end of a sealed corrugated bellows 88 which is adjustably mounted in a chamber 89 by means of a stud 90. A pipe 91 communicates the chamber 89 with the discharge ring 16 of the supercharger. Bellows 88, which may be evacuated to any desired degree, is thus subjected to and will respond to variations in the pressure of the charge supplied to the engine cylinders. A rod 92 connected to the other end of the valve 81 has a spring retaining cup 93 secured thereto and is forced downwardly by a spring 94. A second spring 95 is received between the cup 93 and a second cup 96 slidably mounted on the cup 93. Cup 96 has a slotted extension 97 forming an overrunning connection with one arm 98 of a lever pivoted at 99. The other arm 100 of the lever is connected to the cable 28. An adjustable stop 101 may be provided if desired to limit the movement of cable 28 and the arm 100.

The servo valve 65 is somewhat similar to the valve 66 and is provided with a cylindrical valve bore having spaced grooves 102, 103, 104, 105 and 106 of which grooves 103 and 105 are respectively connected by pipes 108 and 109 to the cylinder 34 on opposite sides of the piston 33; grooves 102 and 106 are connected by pipes 111, 112, 113 and 79 to the inlet pipe 59 of the pump; and groove 104 communicates with the high pressure fluid supply pipe 62. A valve element 115 is slidable in the valve bore and is provided with lands 116, 117 and 118 separated by relieved portions 119 and 120. A rod 122 connects the valve 115 to a sealed collapsible expansible capsule 123, which may be evacuated to any desired degree so as to correlate its temperature and pressure responsiveness, adjustably mounted in a chamber 124 communicating with the air inlet 11 by means of pipe 125. A spring 127 urges the valve 115 toward the left.

During idling operation at ground level the various parts will occupy the positions shown in Figure 1. The low absolute pressure in the ring or manifold 16 is transmitted through pipe 91 to chamber 89 and allows the bellows 88 to expand to the position shown under the influence of spring 94, moving the valve 81 to its most downwardly position. The relieved portion 85 intercommunicates the grooves 70 and 71 whereby high pressure fluid from pipe 63 is transmitted through pipe 74 to the cylinder 54 and forces the piston 53 and pivot 46 to the extreme left. Fluid leaking past the piston 53 is transmitted through pipe 75, grooves 72 and 73, and pipes 77, 78 and 79 to the inlet side of the pump 58. At such times the pivot 46 serves merely as a fixed pivot for the lever 45.

The relatively high pressure in the air entrance 11 at ground level is transmitted to the chamber 124 of valve 65 causing the bellows to contract and move the valve 115 to its extreme right-hand position. High pressure fluid supplied to the servo valve 65 through pipe 62 is transmitted through grooves 104 and 103 and pipe 108 to the cylinder 34, urging the piston 33 upwardly. Fluid leaking past the piston 33 or through the port 37 is transmitted to the inlet side of the pump by means of pipe 109, grooves 105, 106 and pipes 112, 113 and 79. The movable stop 32 is thus forcefully urged to its upper position and tends to prevent downward movement of the gear box shift lever 26. The pilot, however, may force the supercharger shift lever 26 into the high speed step by exerting a high force on the control knob 29 and thus forcing the piston 33 downwardly in opposition to the spring 35 and fluid pressure in cylinder 34. Upon release of the knob 29 the piston 33 will return the supercharger to its low speed step. Such a provision is generally made so that the supercharger, particularly in the case of a two-stage supercharger, may be warmed up while on the ground.

To increase the power output of the engine, as for take-off, the pilot opens the throttle by moving the knob of the throttle control lever 41 to the left. The high pressure fluid in the right end of the cylinder 54 then prevents shifting of the pivot 46. As the throttle opens the manifold pressure increases and tends to collapse the bellows 88 against the force of spring 94. As the manifold pressure approaches the maximum permissible value, the bellows 88 raises the valve 81 and the valve land 83 approaches a position of registration with the groove 71. However, no movement of piston 53 occurs. Upon further opening movement of the throttle lever 41 the throttle 40 likewise tends to open further and raises the manifold pressure above the maximum permissible value. The bellows is further compressed and raises the valve land 83 still more above and out of registration with the groove 71 whereby the relieved valve portions 86 and 85 respectively intercommunicate the pipes 63 and 75 for supplying high pressure fluid to the left end of cylinder 54, and pipes 74 and 76 for transmitting fluid from the right end of the cylinder 54 to the inlet of the pump 58. High pressure fluid acting on the left of the piston 53 then moves the piston and pivot 46 to the right and closes the throttle 40 until the manifold pressure is reduced to the maximum permissible value, at which time the valve 81 moves downwardly and tends to bring the land 83 again into registration with the groove 71. Thus movement of the lever 41 beyond the position required for maximum permissible manifold pressure results merely in movement of the pivot 46 to the right and does not further open the throttle, except a negligible amount necessary for actuating the servo valve. During this period of operation the maximum manifold pressure is determined by the spring 94, the spring 95 being inoperative due to the slot 97 which permits bodily movement of the spring 95 and retaining cup 96.

Upon increase in altitude the bellows 123 of the servo valve 65 tends to expand as a result of the decreased entering air pressure transmitted to chamber 124 through pipe 125. As the upper extreme of the first altitude zone is approached, during which the first supercharger step or low impeller speed is sufficient to produce maximum permissible charging pressure, the land 117 of valve 115 approaches registration with groove 104. Upon further increase in altitude the bellows further expands and relieved valve portions 120 and 119 respectively intercommunicate pipes 62 and 109 to supply high pressure fluid to the top of piston 33 and pipes 108 and 111 to transmit fluid from below the piston 33 to the inlet of the pump 58. High pressure fluid forces the piston 33 downwardly and moves stop 32 out of an interfering position with lever 26. It is generally desirable to adjust spring 127 so that the stop 32 will be withdrawn at an altitude somewhat below the upper limit of the first altitude zone, to provide a limited range of altitude during which the second supercharging step may be introduced even though the first step is sufficient to maintain the maximum permissible pressure.

During operation above the shift altitude (at which the stop 32 is withdrawn) the pilot may, if desired, introduce the second step of supercharging by pulling the knob 29, thus moving the lever 26 to its lower position. Pulling out the knob 29 also varies the datum of the boost control by rotating the lever pivoted at 99 which renders the spring 95 operative along with spring 94 to yieldingly resist upward movement of valve 81. A greater manifold pressure, in an amount sufficient to produce the added power required by the supercharger in the second step, is therefore permitted before the boost control will limit the throttle opening.

Upon decrease in altitude below the shift altitude, the bellows 123 collapses and high pressure fluid is again supplied to the cylinder 34 below the piston 33 and, together with the spring 35, forces the stop 32 upwardly. If the supercharger is in the second or high speed step, the stop 32 will shift the supercharger lever 26 upwardly into its first step position and will simultaneously pull the cable 28 to the left and move the lever arm 100 to the left. The spring 95 is thus again rendered inoperative and the maximum permissible manifold pressure is reduced. Mechanism for selectively supplying motivating fluid to one or the other side of piston 33 is provided to accomplish a more rapid shift in the stop 32; however, it will be apparent that if the spring return of stop 32 is sufficiently rapid, the spring may be used to move the piston 33 in one direction and high pressure fluid to move the piston in the opposite direction. For such an arrangement the pipe 108 may lead directly to the inlet of the pump and the grooves 102, 103 and pipe 111 may be eliminated, thus somewhat simplifying the servo valve 65.

Although a manually operated lever 26 has been shown for shifting the supercharger step, it will be apparent that the stop 32 and knob 29 could operate a control element of an electrical or hydraulic system for shifting the supercharger step.

A modified form of the invention is disclosed in Figure 2 in which corresponding parts have been given corresponding reference numerals with the addition of 200.

In this modification an auxiliary snap-type of valve designated generally at 400 is provided to control the flow of motivating fluid both to the servo valve 266 and to the movable stop control cylinder 234. The valve 400 is provided with a bore having eight grooves therein numbered 401 to 408 inclusive of which groove 401 is connected by pipe 409 to the top portion of cylinder 234, the bottom portion of which is in constant communication with the inlet of pump 258 by means of a pipe 410. Grooves 402 and 407 are connected by pipes 412, 413 and 414 with the outlet of pump 258. Groove 403 is connected to the groove 271 of the valve 266 by a pipe 416. Groove 404 communicates with the inlet of pump 258 by means of a pipe 417 and the pipe 410. Groove 405, groove 270 of valve 266, and the left-hand portion of cylinder 254 are in constant communication by means of pipes 418 and 419. Groove 406 is connected to grooves 269 and 273 by a pipe 420 having branches 421 and 422. Groove 408 communicates through a pipe 423 with the groove 272 which in turn communicates through a pipe 424 with the right-hand end of cylinder 254.

A valve element 426, slidably received in the bore of the valve 400, is provided with lands 427, 428, 429 and 430 separated by reduced portions 431, 432 and 433. A spring 435 urges the element 426 to the right against a stop 436. A bore 437 having a restriction 438 is provided in the valve element 426. A transverse bore 439 intersecting the bore 437 is provided in the relieved portion 432 of the element 426.

The servo valve 265 has a valve bore having two grooves 442 and 443 which are respectively connected by pipes 444, 414 to the pump outlet and by pipe 445 to the bore of the auxiliary valve 400 to the right of the valve element 426. The valve element of the servo valve 265 is provided with two lands 447 and 448 separated by a groove 449.

The parts of the device disclosed in Figure 2 are shown in the positions they will occupy with the engine idling at ground level. At this time high pressure motivating fluid is supplied through pipe 414 to pipes 444, 412 and 413; however, pipes 444 and 412 are rendered ineffective by the land 447 of the valve 265 and the lands 427 and 428 of valve 400 respectively. Pipe 413 supplies fluid through the intercommunicated grooves 407, 408, pipe 423, groove 272, and pipe 424 to the right-hand end of the cylinder 254, whereby the fluid forces the piston 253 and pivot 246 to the extreme left. The opposite end of cylinder 254 is in communication with the inlet of the pump 258 by means of pipe 418, grooves 404, 405, and pipes 417 and 410. Pipe 419, which also communicates with the left end of cylinder 254, is ineffective since pipe 416, with which it is connected through grooves 270, 271, is sealed by the land 428 of the valve 426. During this period the stop 232 is forced up by the spring 235, the pipe 409 being sealed by the land 427 and the pipe 410 being in communication with the inlet of the pump. As in the modification of Figure 1 the pilot, by forcefully pulling out the knob 229 and holding it, may pull down the lever 226 and shift the supercharger into the second or high speed step.

With the instant device, in contrast to that of Figure 1, no boost control is provided at altitudes below the so-called shift altitude at which the stop 232 is withdrawn. Thus in the first altitude zone the pilot may move the lever 241 to open the throttle to or beyond the position at which the manifold pressure is sufficient to actuate the bellows 288. As the normal governed pressure is exceeded the bellows moves the valve 281 upwardly in opposition to spring 294 until the land 282 completely uncovers the groove 269. No movement of piston 253 occurs, however, since the supply of high pressure fluid to the right side of piston 253 is maintained through pipe 424, groove 272, pipe 423, grooves 407, 408 and pipes 413, 414. Likewise, the left side of piston 253 continues to be connected to the inlet side of the pump through pipe 418, grooves 404, 405, and pipes 417, 410. The passage of which pipe 419 forms a portion now includes grooves 269, 270, and pipes 421, 420, and is closed by the land 429 of valve 426.

Upon increase in altitude to the shift altitude, the decreased pressure on bellows 323 causes it to expand whereby the land 447 uncovers groove 442 and high pressure fluid is supplied to the valve 400. The fluid acting on the right end of valve 426, and being bled by only a very small port 438, causes the valve to move suddenly to the left whereby grooves 401 and 402 are brought into full communication. High pressure fluid from pipe 412 is thus supplied through pipe 409 to the top side of piston 233 which rapidly and completely lowers the stop 232. At this or any higher altitude the pilot may select at will the supercharger step in which he desires to operate.

If we assume the engine is operating above the shift altitude at manifold pressures below the maximum permissible value, the valve 281 will be in the position shown. The piston 253 is maintained, as before, in its extreme left-hand position by means of high pressure fluid supplied through pipe 424, grooves 272, 273, pipes 422, 420, grooves 406, 407 and pipes 413, 414. At this time pipe 423, communicating with groove 272, is closed at its other end by the land 430 of valve 426. The left side of piston 253 is connected to the pump inlet through pipe 419, grooves 270, 271, pipe 416, grooves 403, 404, and pipes 417, 410. The connection from the left side of piston 253 through pipe 418 is now closed by the land 429.

If the pilot now operates the lever 241 to open the throttle beyond the position at which the maximum permissible manifold pressure is produced, the bellows 288 will contract and raise the valve 281. When the land 282 begins to uncover the groove 269, high pressure fluid will be supplied to the left side of piston 253 through pipe 419, grooves 270, 269, pipes 421, 420, grooves 406, 407, and pipes 413, 414. It may be noted that pipe 418 from the left side of piston 253 continues to be closed by land 429. Simultaneously, the right side of piston 253 will be connected to the pump inlet through pipe 424, grooves 271, 272, pipe 416, grooves 403, 404 and pipes 417, 410. Movement of piston 253 to the right by the high pressure fluid on its left-hand face moves the pivot 246 to the right and partially closes the throttle to reduce the manifold pressure to the desired value.

Upon a decrease in altitude below the shift position the land 447 closes the groove 442, cutting off the supply of high pressure fluid to pipe 445. Fluid which would otherwise be trapped to the right of valve 426 bleeds through restriction 438, and ports 437 and 439 to the inlet side of the pump and permits the spring 435 to urge the valve 426 to its right-hand position. Land 427 cuts off the supply of fluid to the top of ported piston 233 and spring 235 forces the piston and stop 232 upwardly and automatically shifts the lever 226 to its low speed position.

Figure 2 as described utilizes the same motivating fluid, namely fluid from the pump 258, to actuate three different instrumentalities, the piston 253, the piston 233 and the valve 426. It will be apparent that if desired two or even three different sources of motivating fluid could be used. For example, oil could be supplied to pipe 444 for actuating the valve 426 and compressed air from either one or two sources could be supplied to pipes 412 and 413 for respectively operating pistons 233 and 253. Likewise, the servo valve 265 could be used to control two snap valves for respectively controlling the flow of an actuating fluid to the pistons 283 and 253.

Although but two embodiments of the invention have been particularly described, each provided with specific features, it is obvious that these various features of one may be readily incorporated in the other. Furthermore, it will be apparent that the invention although described in connection with a two-speed supercharging system may be readily applied to multispeed, or multi-stage, or multi-speed stage systems. It will also be understood that many changes might be made in the form and arrangement of parts and it is not intended that the scope of the invention shall be limited to the forms shown and described nor otherwise than by the terms of the appended claims.

I claim:

1. A control device for an internal combustion engine having a throttle for controlling the air supply to the engine and a multiple step supercharging system comprising manual means for actuating the throttle, a boost control for limiting the degree of throttle opening to thereby prevent the engine cylinder charging pressure from exceeding a predetermined value, means for increasing the supercharging step, and means normally operative to prevent an increase in the supercharging step under conditions of operation at which the charging pressure available by opening the throttle exceeds said predetermined value.

2. A control device for an internal combustion engine having an air throttle and a multiple step supercharging system comprising a boost control for limiting the cylinder charging pressure, means for varying the step of supercharging, and means responsive to variations in altitude and operative to normally prevent change from one to a higher step of supercharging at altitudes below a predetermined value.

3. In a control for an internal combustion engine having a multiple step supercharging system, a boost control device for limiting the charging pressure of the engine, a source of motivating fluid for operating the boost control device, a fluid actuated device for limiting the supercharging step, a source of motivating fluid for the latter device, and means responsive to pressures varying with change in altitude for controlling the supply of motivating fluid to at least one of said devices.

4. A control for an internal combustion engine having an induction passage including an air entrance, a throttle and a multiple step supercharger comprising a boost control having a fluid actuated member for varying the position of the throttle, a valve controlling the supply of motivating fluid to the member, a sealed bellows responsive to the pressure in the passage posterior to the supercharger for controlling said valve, an element operative to change the step of the supercharger, a device for limiting operation of said element and including a fluid actuated member, a valve controlling the supply of motivating fluid to the last named member, and a bellows responsive to the pressure in the air entrance for controlling said last named valve.

5. The invention defined in claim 4 comprising in addition means for varying the datum of the boost control.

6. In a control for an internal combustion engine having a throttle and a multiple step supercharging system, means for actuating the throttle including a manually operated control element, means for varying the supercharging step, a variable datum boost control for limiting the charging pressure of the engine, and means operative independently of said manually operated control element upon increase in the supercharging step for increasing the datum of the boost control.

7. In a control for an internal combustion engine having a multiple step supercharging system, a variable datum boost control, and means for simultaneously varying the supercharging step and abruptly varying the datum of said boost control.

8. In an internal combustion engine having a throttle, a boost control operative to limit the throttle opening for preventing the cylinder charging pressure from exceeding a predetermined value, and means operative to render the boost control ineffective at altitudes below a predetermined value.

9. A control for an internal combustion engine having a multiple step supercharging system, comprising a boost control operative to limit the engine throttle opening for preventing the cylinder charging pressure from exceeding a predetermined value, means operative to render the boost control ineffective at altitudes below a predetermined value, and means operative to prevent an increase in the supercharging step at altitudes below a predetermined value.

10. A control for an internal combustion engine having a throttle and a variable capacity supercharger system, comprising a boost control having a fluid actuated member for varying the position of the throttle, a servo valve controlled by a bellows responsive to variations in the pressure in the engine manifold for controlling the supply of fluid to said member, a fluid actuated device for limiting the rise across the supercharger, fluid operated valve means for controlling the supply of fluid to said member and to said device, and a valve controlled by a bellows responsive to variations in pressures varying with changes in altitude for controlling the supply of fluid for operating said valve means.

11. In a control for an internal combustion engine having two supercharging steps, an element for selecting the supercharger step, manual means for actuating said element, means for resisting movement of said manual means from the low to the high step position with a moderate force, and means for rendering said resisting means inoperative at altitudes above a predetermined value.

12. In an internal combustion engine a boost control for limiting the charging pressure of the engine and having a fluid actuated element, a source of motivating fluid, a pair of valves in series relation for controlling the flow of motivating fluid from the source to the element, means responsive to the pressure in the engine manifold for controlling one of said valves, and means responsive to variations in altitude for controlling the other of said valves.

13. In a control for an engine having a multiple-step supercharger, a throttle for controlling the supply of air to the engine, a charging pressure control for operating the throttle to limit the charging pressure, means for changing the supercharger step including a fluid actuated member, fluid transmitting passages leading to the charging pressure control and to the fluid actuated member, valve means controlling the said passages, and means responsive to a pressure anterior to the throttle for controlling said valve means.

14. In combination with an internal combustion engine, a supercharger having two distinct supercharger-to-engine speed ratios, a throttle, a boost control operatively related to the throttle for controlling the cylinder charging pressure, manually operable means rendered operative at a predetermined altitude for shifting the supercharger from its lower to its higher speed ratio, and means responsive to an increase in pressure anterior to the throttle for automatically shifting the supercharger from its higher to its lower speed ratio.

15. A control device for an internal combustion engine having an air throttle and a supercharger having two distinct supercharger-to-engine speed ratios, comprising a charging pressure control for limiting the engine charging pressure, means actuated independently of the throttle for shifting the supercharger from the low speed ratio to the high speed ratio, and means rendering said shifting means freely operative for shifting from a low to a high speed ratio only at altitudes above a predetermined value.

16. For use with an internal combustion engine having a variable capacity supercharging system, a boost control for limiting the charging pressure of the engine and having a fluid actuated member, a device for varying the engine-to-supercharger speed ratio having a fluid actuated member, a source of motivating fluid, valve means controlling the flow of motivating fluid from the source to one of said members, other valve means controlling the flow of motivating fluid from the source to the other of said members, means for controlling one of the valve means in accordance with charging pressure and a pressure varying with change in altitude, and means for controlling the other of the valve means in accordance with one of the last-named pressures.

17. In a control for an internal combustion engine having a variable step supercharging system, a variable datum boost control, and means including an element operative only upon change in the supercharging step for varying the datum of said boost control.

18. In a control for an internal combustion engine having a throttle and a variable step supercharging system, a manually actuated control element operative to vary the throttle position, power means for varying the throttle position to maintain a predetermined engine charging pressure, means controlling said power means including a wall movable in response to variations in engine charging pressure, a spring resisting movement of said wall, and means dependent upon variation in the step of supercharging for varying the load on said spring.

19. In a control for an internal combustion engine having a variable capacity supercharging system and a throttle for varying the engine charging pressure, a manually actuated control element operative to vary the engine charging pressure, a variable datum boost control for controlling the engine charging pressure, and means operative without movement of the manually actuated control element upon increase in the output of the supercharging system for increasing the datum of the boost control to thereby compensate for the increase in power consumption of the supercharging system.

20. A control device for an internal combustion engine having an induction passage including an air inlet section, a throttle, and a variable capacity supercharging system comprising a boost control for actuating the throttle to limit the engine charging pressure, a movable fluid actuated element for varying the capacity of the supercharging system, a valve controlling the flow of fluid to said element, a sealed pressure responsive capsule for controlling said valve, and means for subjecting the capsule to a variable pressure including a pressure transmitting passageway connected to the induction passage anterior to the throttle and supercharging system.

21. In combination with an internal combustion engine, a supercharger having two distinct supercharging speed ratios, a throttle, a boost control operatively related to the throttle for controlling the cylinder charging pressure, means for shifting the supercharger from its lower to its higher speed ratio, means responsive to an increase in pressure anterior to the throttle for automatically shifting the supercharger from its higher to its lower speed ratio, and manual means for rendering said automatic means inoperative, said automatic shifting means including a yielding member actuatable by said manual means and normally maintaining the supercharger in low speed ratio at altitudes below a predetermined value.

22. In combination with an internal combustion engine provided with a throttle-controlled induction passage and a variable speed supercharger, power-control mechanism operatively connected to the throttle for regulating the same, means rendering said mechanism inoperative in a throttle-opening direction in the event the charging pressure exceeds a predetermined value, and means operative to limit the speed of the supercharger when the charging pressure available by increasing the throttle opening exceeds said value.

23. In a control device for an internal combustion engine having a multiple step supercharging system, control means responsive to variations in altitude operative to reduce the supercharging step upon a decrease in altitude below a predetermined value, and manually actuated means for overriding the control of the last named means at altitudes below said value to provide at times a supercharger step higher than the one selected by the said control means.

24. In a control for an internal combustion engine having a variable speed supercharging system, manually actuated means for increasing or decreasing the ratio of supercharger-to-engine speed, means for automatically interposing a yielding resistance to said manual means when the latter is moved in a direction to increase the supercharger speed at altitudes below a predetermined value, and automatically operating means for decreasing the ratio of supercharger-to-engine speed upon a decrease in altitude below a predetermined value.

25. In a control for an internal combustion engine having an induction passage provided with a throttle and a variable capacity supercharger, means for varying the capacity of the supercharger, a variable datum boost control operatively connected to the throttle for automatically regulating the engine charging pressure including a movable pressure-responsive device and a resilient element adjustable to vary the effective movement of said device, and means operatively connected to said capacity-varying means for adjusting said element upon a change in the capacity of the supercharging system.

26. In a control for an internal combustion engine having an induction passage provided with a throttle and a variable capacity supercharger, means for varying the capacity of the supercharger, a variable datum boost control operatively connected to the throttle for automatically regulating engine charging pressure including a spring adjustable to vary the datum of said control, and means rendered operative upon a change in the supercharger capacity for adjusting said spring.

FRANK C. MOCK.

REFERENCES CITED

The following references are of record in the file of this patent:

UNITED STATES PATENTS

| Number | Name | Date |
|---|---|---|
| 1,723,879 | Morton | Aug. 6, 1929 |
| 2,016,846 | Waseige | Oct. 8, 1935 |
| 2,088,954 | Gregg | Aug. 3, 1937 |
| 2,228,239 | Ammann | Jan. 14, 1941 |
| 2,217,364 | Halford et al. | Oct. 3, 1937 |
| 1,300,344 | Case | Apr. 15, 1919 |
| 2,203,243 | Wettstein | June 4, 1940 |
| 2,293,293 | Harcum | Aug. 18, 1942 |
| 2,297,213 | Gosslau et al. | Sept. 19, 1942 |
| 2,242,374 | Schultz | May 20, 1941 |
| 2,223,715 | Berger | Dec. 3, 1940 |

FOREIGN PATENTS

| Number | Country | Date |
|---|---|---|
| 454,154 | England | 1936 |
| 348,868 | England | 1931 |
| 790,619 | France | 1935 |
| 446,144 | England | 1936 |
| 465,329 | England | 1937 |
| 505,829 | England | 1939 |
| 495,497 | England | May 31, 1938 |